United States Patent
Jang et al.

(10) Patent No.: US 8,576,797 B2
(45) Date of Patent: Nov. 5, 2013

(54) APPARATUS AND METHOD FOR HANDOVER OPTIMIZATION IN BROADBAND WIRELESS COMMUNICATION SYSTEM

(75) Inventors: Byoung-Gi Jang, Suwon-si (KR); Jung-Hee Han, Seoul (KR); Mi-Sun Do, Suwon-si (KR); Young-Jun Park, Seoul (KR); Jung-Min So, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 12/806,462

(22) Filed: Aug. 13, 2010

(65) Prior Publication Data

US 2011/0044285 A1    Feb. 24, 2011

(30) Foreign Application Priority Data

Aug. 24, 2009   (KR) .................. 10-2009-0077996

(51) Int. Cl.
*H04W 4/00*    (2009.01)
(52) U.S. Cl.
USPC .......................................... 370/331
(58) Field of Classification Search
USPC ......... 370/203, 204–215, 229–240, 310–337, 370/338–350, 395.1, 395.3, 395.4, 395.41, 370/395.42, 395.5, 395.52, 395.53, 370/412–421, 431–457, 458–463, 464–497, 370/498–529
See application file for complete search history.

(56) References Cited

U.S. PATENT DOCUMENTS

| | | | |
|---|---|---|---|
| 2003/0119508 A1* | 6/2003 | Gwon et al. ................... | 455/436 |
| 2004/0266434 A1* | 12/2004 | Lehtinen et al. ............... | 455/436 |
| 2009/0131056 A1* | 5/2009 | Bontu et al. ................... | 455/436 |
| 2010/0172321 A1* | 7/2010 | Yokota .......................... | 370/331 |
| 2010/0273487 A1* | 10/2010 | Alonso-Rubio et al. ....... | 455/436 |

OTHER PUBLICATIONS

European Search Report dated Dec. 30, 2010 in connection with European Patent Application No. EP 10 17 1815.
"Additional RLF information reporting for MRO", Samsung, 3GPP TSG-RAN WG3 Meeting #66bis, Jan. 17-22, 2010, 4 pages.
"MRO Signaling Requirements", Huawei, 3GPP TSG-RAN WG3 #64, May 4-8, 2009, 8 pages.
"Addressing the requirements for HO optimisation", Huawei, 3GPP TSG-SA5 (Telecom Management), Oct. 13-17, 2008, 9 pages.
"Mobility Robustness Optimization Solution", Huawei, 3GPP TSG RAN WG3 Meeting #59, Feb. 11-15, 2008, 4 pages.
"Detailed description of MRO problem cases", Huawei, 3GPP TSG-RAN WG3 #64, May 4-8, 2009, 6 pages.
"Specification impact for Mobility Robustness Optimisation", Samsung, 3GPP TSG-RAN WG3 Meeting #64, May 4-8, 2009, 4 pages.

* cited by examiner

*Primary Examiner* — Jung-Jen Liu

(57) ABSTRACT

A method and apparatus optimize handover optimization in a broadband wireless communication system. Operations of a base station includes determining whether at least one of a plurality of time intervals included in a total time taken by handover, exceeds a threshold time. Whether to advance or delay a handover point is determined based on which at least one of the time interval exceeds the threshold time. And at least one handover parameter is changed to advance or delay the handover point.

21 Claims, 4 Drawing Sheets

APPARATUS AND METHOD FOR HANDOVER OPTIMIZATION IN BROADBAND WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Aug. 24, 2009 and assigned Serial No. 10-2009-0077996, the entire disclosure of which is hereby incorporated by reference.

TECHNICAL FIELD OF THE INVENTION

The present invention relates generally to a broadband wireless communication system. More particularly, the present invention relates to an apparatus and a method for optimizing handover performance in the broadband wireless communication system.

BACKGROUND OF THE INVENTION

In a broadband wireless communication system, a user terminal accesses an Internet Protocol (IP) network for a service by connecting to a base station over a radio channel. The base station has a fixed coverage. This coverage is determined by transmit powers of the base station and the terminal and, accordingly, is physically limited. Hence, the broadband wireless communication system is constructed to deploy a plurality of the base stations at proper intervals by taking into account the coverage of the base stations.

The terminal accesses the base station with the best channel among the base stations at the current location. The base station with the best channel can change according to the movement of the terminal. When this happens, it is advantageous for the terminal to alter its serving base station. When the change of the serving base station interrupts the service, the service quality is degraded. Thus, the broadband wireless communication system supports inter-cell handover to support the mobility of the terminal.

Optimization of the handover performance aims at providing the seamless service in the change of the serving base station and minimizing overhead of the signaling for the handover. Specific solutions and issues for optimizing the handover performance should be deliberated from various angles based on the characteristics of the system. To enhance the service quality, it is necessary to suggest a specific method for optimizing the handover performance in accordance with the characteristics of the system.

SUMMARY OF THE INVENTION

To address the above-discussed deficiencies of the prior art, it is a primary aspect of the present invention to provide an apparatus and a method for optimizing handover performance in a broadband wireless communication system.

Another aspect of the present invention is to provide an apparatus and a method for addressing handover latency in a broadband wireless communication system.

Another aspect of the present invention is to provide an apparatus and a method for adjusting a point of handover in a broadband wireless communication system.

Another aspect of the present invention is to provide an apparatus and a method for advancing or delaying the point of handover by modifying handover parameters in a broadband wireless communication system.

Yet another aspect of the present invention is to provide an apparatus and a method for detecting increment of handover latency in a broadband wireless communication system.

According to one aspect of the present invention, an operating method of a base station in a broadband wireless communication system includes determining whether at least one of a plurality of time intervals included in a total time taken by handover, exceeds a threshold time. Whether to advance or delay a handover point is determined according to which of the at least one of the time intervals exceeds the threshold time. And at least one handover parameter is changed to advance or delay the handover point.

According to another aspect of the present invention, an apparatus of a base station in a broadband wireless communication system includes a determiner for determining whether at least one of a plurality of time intervals included in a total time taken by handover exceeds a threshold time. The apparatus also includes a manager for determining whether to advance or delay a handover point according to which of the at least one of the time intervals exceeds the threshold time, and changing at least one handover parameter to advance or delay the handover point.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIG. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged broadband wireless communications systems.

Embodiments of the present invention provide an apparatus and a method for optimizing handover performance in a broadband wireless communication system. Hereinafter, an Orthogonal Frequency Division Multiplexing (OFDM)/Orthogonal Frequency Division Multiple Access (OFDMA) wireless communication system is exemplified. However, the present invention is applicable to other wireless communication systems.

Issues to address and solutions for optimizing the handover performance can be deliberated from various viewpoints according to characteristics of a system. For example, in a 3$^{rd}$ Generation Partnership Project (3GPP2) Long Term Evolution (LTE) system, the point of the handover can be controlled by adjusting parameters involving the handover. A handover process of the LTE system is described.

Figure 1:
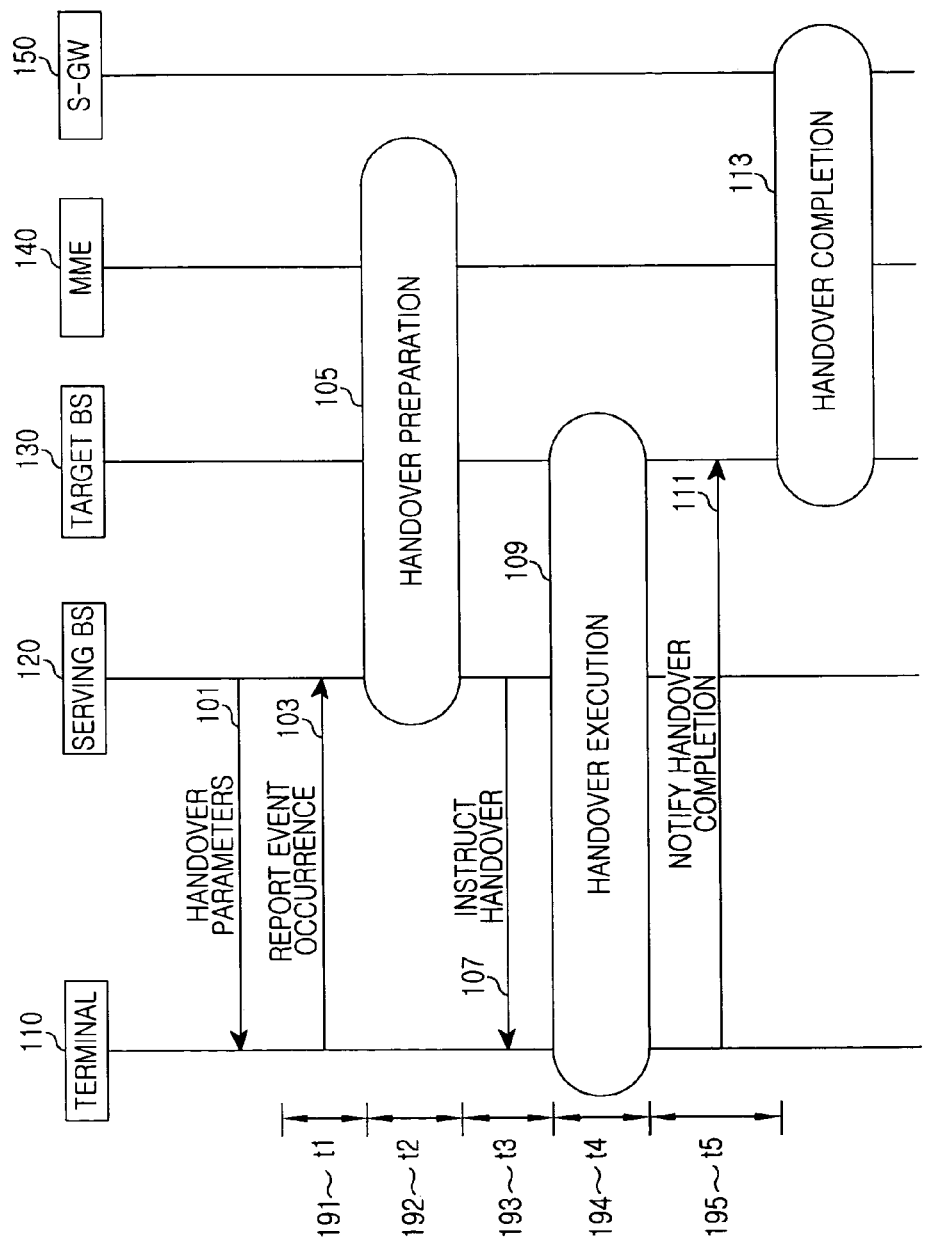
FIG. 1 illustrates a handover process in a broadband wireless communication system according to an embodiment of the present invention.

FIG. 1 depicts the handover process in the broadband wireless communication system according to an embodiment of the present invention.

In FIG. 1, a terminal 110, a serving Base Station (BS) 120, a target BS 130, a Mobility Management Entity (MME) 140, and a Serving-Gateway (S-GW) 150 are involved in the handover of the terminal 110. The terminal 110 is the user equipment, the BSs 120 and 130 manage radio access of the terminal 110, the MME 140, which is an upper node of the BSs 120 and 130, is responsible for the signaling, and the S-GW 150, which is an upper node of the BSs 120 and 130, transmits and receives traffic.

Prior to the handover, the serving BS 120 transmits the handover parameters 101 to the terminal 110. The parameters include information used to determine when events related to the handover defined by the system occur. The delivery of the parameters can be called measurement control. For example, the events are defined as shown in Table 1.

In Table 1, 'Ms' denotes a channel quality measurement value of the serving BS measured at the terminal, 'Hys' denotes a hysteresis parameter per event, 'Mn' denotes a channel quality measurement value of a neighbor BS measured at the terminal, 'Ofn' denotes a frequency-specific offset of the neighbor BS, 'Ocn' denotes a specific offset of the neighbor BS, 'Ofs' denotes a frequency-specific offset of the serving BS, 'Ocs' denotes a specific offset of the serving BS, and 'Off' denotes an offset parameter per event. All or some of the events in Table 1 can be selectively used to determine whether to perform a handover.

Next, the terminal 110, recognizing at least one event, sends the event occurrence report 103 to the serving BS 120. In so doing, the terminal 110 transmits identification information of the event and measurement values of variables related to the event. For example, among the events of Table 1, when event A3 occurs, the terminal 110 reports of the event A3 to the Serving BS 120. The report of the event occurrence is also called a measurement report. The serving BS 120 receiving the event report determines that the reported event involves the handover, and prepares for the handover of the terminal 110 in block 105. That is, the serving BS 120 determines to process the handover, and signals with the target BS 130 and the MME 140 for the handover. The serving BS 120, upon completing the preparation for the handover, sends the handover instruction 107 to the terminal 110. Hence, the terminal 110 and the serving BS 120 conduct the handover in block 109. In detail, the terminal 110 synchronizes to connect to the target BS 130, and disconnects from the serving BS 120. The serving BS 120 forwards data to transmit to the terminal 110 to the target BS 130. The terminal 110, upon completing the synchronization with the target BS 130, sends the handover completion notification 111 to the target BS 130. Receiving the notification of the handover completion, the target BS 130 changes a data path of the terminal 110 by signaling to the MME 140 of the terminal 110, and receives the data to transmit to the terminal 110, from the serving BS 120 in block 113.

In the handover process of FIG. 1, the time taken to perform the handover can be divided into, on the interval basis, t1 191 taken for the terminal 110 to report the event occurrence to the serving BS 120, t2 192 taken for the serving BS 120 to process the handover preparation procedure, t3 193 taken for the serving BS 120 to instruct the handover to the terminal 110, t4 194 taken for the terminal 110 to synchronize with the target

TABLE 1

| event | description | Occurrence condition | Release condition |
|---|---|---|---|
| A1 | Channel quality of serving BS is better than a threshold. | Ms − Hys > Thresh | Ms + Hys < Thresh |
| A2 | Channel quality of serving BS is worse than a threshold. | Ms + Hys < Thresh | Ms − Hys > Thresh |
| A3 | Channel quality of neighbor BS is better than channel quality of serving BS | Mn + Ofn + Ocn − Hys > Ms + Ofs + Ocs + Off | Mn + Ofn + Ocn + Hys < Ms + Ofs + Ocs + Off |
| A4 | Channel quality of neighbor BS is worse than channel quality of serving BS | Mn + Ofn + Ocn − Hys > Thresh | Mn + Ofn + Ocn + Hys < Thresh |
| A5 | Channel quality of serving BS is worse than a first threshold and channel quality of neighbor BS is better than a second threshold and | Ms + Hys < Thresh1 & Mn + Ofn + Ocn − Hys > Thresh2 | Ms − Hys > Thresh1 & Mn + Ofn + Ocn + Hys < Thresh2 |

BS 130, and t5 195 taken for the terminal 110 to notify the handover completion to the target BS 130.

Of the time intervals 191 through 195, the t1 191 and the t3 193 can vary according to the channel quality between the terminal 110 and the serving BS 120, and the t4 194 and the t5 195 can vary according to the channel quality between the terminal 110 and the target BS 130.

Figure 2:
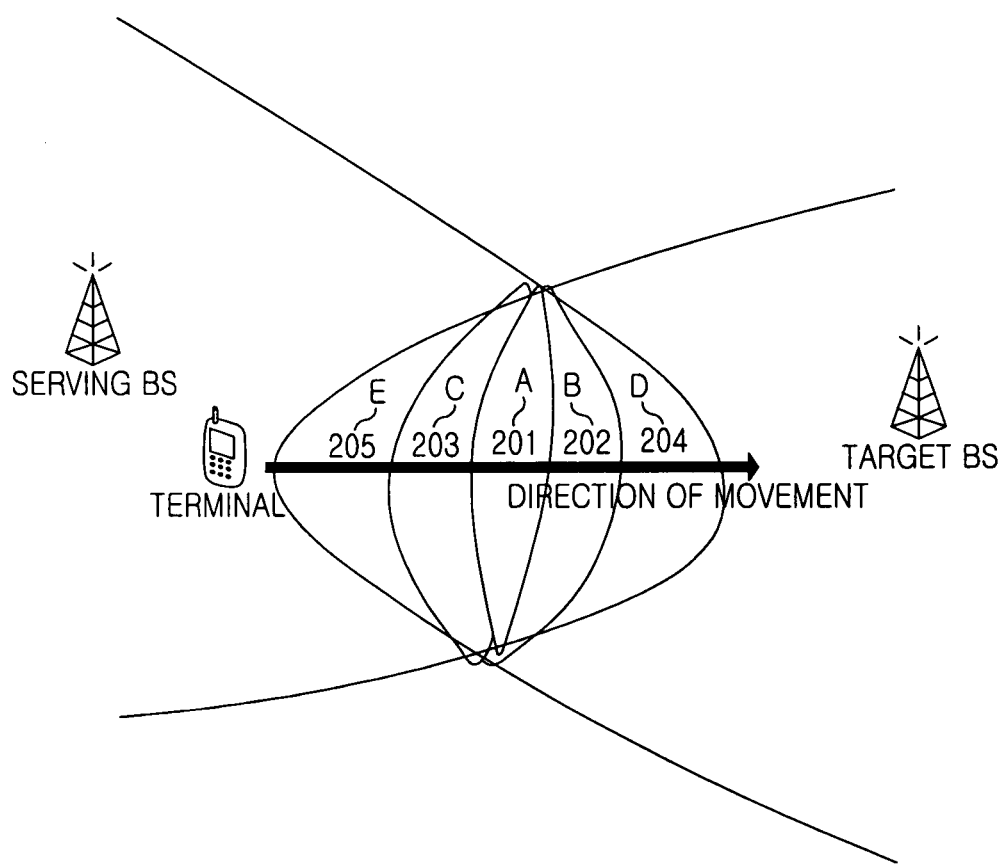
FIG. 2 illustrates locations for handover in the broadband wireless communication system according to an embodiment of the present invention.

Problems when the channel quality between the BS and the terminal is hostile are discussed. FIG. 2 depicts locations for the handover.

Referring to FIG. 2, the handover in a place A 201 is conducted under the most ideal condition. In this situation, the handover optimized in the handover latency is performed.

The handover in a place D 204 is under the very poor condition of the channel quality between the terminal and the serving BS. At this time, Radio Link Failure (RLF) with the serving BS occurs and the handover fails.

The handover in a place B 202 is under the better condition than the place D 204 in spite of the poor channel quality between the terminal and the serving BS. While the RLF with the serving BS does not occur, the increasing number of the retransmissions lengthens the t1 191 or the t3 193 and extends the handover latency.

The handover in a place E 205 is performed under the very bad condition of the channel quality between the terminal and the target BS. The message transmission to the target BS fails and the handover fails.

The handover in a place C 203 is performed under the better condition than the place E 205 even with the poor channel quality between the terminal and the target BS. The message transmission to the target BS does not fail, whereas the increasing number of the retransmissions lengthens the t4 194 or the t5 195 and extends the handover latency.

The problems that result from the handover start point can be addressed by controlling to conduct the handover in the place A 201. Because the terminal travels from the serving BS toward the target BS, the start point of the handover can be altered by adjusting the handover point. For instance, the handover points in the place B 202 and the place D 204, which are late, needs to be advanced, and the handover points in the place C 203 and the place E 205, which are early, need to be postponed. For example, when the event A3 of Table 1 is used as the event for triggering the handover, the BS can alter the handover point by increasing/decreasing at least one of the 'Ofs', the 'Ocs', the 'Off', the 'Hys', the 'Ofn', and the 'Ocn'.

The handover to an inappropriate target BS, the unnecessary handover besides the problems at the handover point, and the handover within a certain time after the connection is established degrade the handover performance, and the corresponding measures are required.

To address those problematic situations, the broadband wireless communication system according to an embodiment defines the problematic situations as shown in Table 2. The BS processes to advance or delay the handover point.

TABLE 2

| problematic situation | description |
| --- | --- |
| 1 Failure due to too late HO triggering | MS performs handover too late or RLF occurs before performing handover. |
| 2 Increased HO latency due to too late HO triggering | Handover latency increases since MS performs handover too late. |
| 3 Failure due to too early HO triggering | RLF occurs since MA performs handover too early. |

TABLE 2-continued

| problematic situation | description |
| --- | --- |
| 4 Increased HO latency due to too early HO triggering | Handover latency increases since MS performs handover too early. |
| 5 Failure due to HO to a wrong cell | RLF occurs since MS performs handover to a wrong cell. |
| 6 Unnecessary HO | Resource is wasted since MS performs unnecessary handover. |
| 7 Unwanted HO subsequent to connection setup | MS performs handover within a certain time after connection setup. |

The occurrence of the problematic situations of Table 2 is determined based on whether the RLF occurs, whether the handover is conducted late, and whether the handover is conducted early.

The occurrence of the RLF is determined as follows. According to the signal quality in the physical layer, in-sync/out-of-sync is determined. When the out-of-sync consecutively occurs over a certain number of times, the terminal observes the occurrence of the in-sync for a certain time. When the in-sync does not take place over the certain number of times within the certain time, the terminal determines the occurrence of the RLF. Conversely, when the in-sync takes place over the certain number of times within the certain time, the terminal operates normally. In the 3GPP2 LTE system, the certain number of times for the out-of-sync is defined as the variable N310, the certain number of times for the in-sync is defined as the variable N311, and the certain time is defined as the variable T310.

The RLF due to the late handover is determined as follows. A BS-A detects the RLF with the terminal and records the occurrence time of the RLF. According to the occurrence of the RLF, the terminal scans the accessible cell through cell reselection. When selecting a BS-B, the terminal performs re-establishment. The BS-B records source cell Identifier (ID) information contained in the message received in the re-establishment and the message reception time, and provides the recorded information to the BS-B pointed by the source cell ID. Hence, the BS-A recognizes the RLF due to the late handover (i.e. the situation '1' of Table 2) by comparing and analyzing the occurrence time of the RLF and the information received from the BS-B.

The RLF due to the early handover is determined as follows. After completing the handover between the BS-A and the BS-B, the terminal notifies the handover completion to the BS-B. The BS-B records the source cell ID and the hand-in event occurrence time with respect to the terminal. Next, the BS-B notifies the handover completion to the BS-A, and the BS-A records the handover success of the terminal and the time of the success notification. The RLF of the terminal takes place, and the BS-B records the time of the RLF. The BS-B informs the BS-A indicated by the source cell ID of the RLF. Concurrently, the terminal scans an accessible cell through the cell reselection. The BS-A is selected, and the terminal performs the re-establishment with the BS-A. The BS-A determines, based on the message received in the re-establishment, that the terminal hands over from the BS-A to the BS-B, and records the time of the re-establishment. Hence, the BS-A recognizes the RLF due to the early handover (i.e. the situation '3' of Table 2) by analyzing the record of the terminal history and the information received from the BS-B.

The values of the t1 through the t5 are determined as follows. In the process of the handover of FIG. 1, the terminal records the time transmitting the event occurrence report. The serving BS records the time at which the event occurrence report is received and the time at which the handover command is transmitted to the terminal. The terminal records the time at which the handover command is received and the time at which the handover completion notification is transmitted. Upon transmitting the notification of the handover completion, the terminal transmits the time at which the event occurrence report is transmitted, the time at which the handover command is received, and the time at which the handover completion notification is transmitted to the target BS. The target BS records the time at which the handover completion notification is received. Next, the target BS transmits the time record information received from the terminal and the time at which the handover completion notification received to the serving BS. Thus, the serving BS calculates the values of the t1 through the t5 using the time record information received from the target BS.

To detect the problematic situations of Table 2, the BS determines the occurrence of the RLF as stated above and collects the handover history information per neighbor cell. Items in the handover history information include a handover success rate, a handover failure rate, a frequency of the RLF due to the late handover, a frequency of the RLF due to the early handover, a frequency of the RLF due to the handover to a wrong cell, a frequency of the unnecessary handover, a frequency of the handover within a certain time after the connection setup, and average values of the t1 through the t5. Based on the handover history information collected per neighbor cell, the BS determines whether the problematic situations take place, and takes the corresponding action. That is, the BS adjusts the handover point in response to the problematic situation.

For instance, when detecting the situation '1' or the situation '2', the BS can advance the handover point by decreasing at least one of the 'Ofs', the 'Ocs', the 'Off', and the 'Hys', or by increasing at least one of the 'Ofn' and the 'Ocn'. When detecting the situation '3' or the situation '4', the BS can postpone the handover point by increasing at least one of the 'Ofs', the 'Ocs', the 'Off', and the 'Hys', or by decreasing at least one of the 'Ofn' and the 'Ocn'. Consequently, the location of the terminal at the point of the handover gets close to the place A 201 of FIG. 2.

Hereafter, a structure and the operations of the BS for optimizing the handover performance as above are elucidated.

Figure 3:
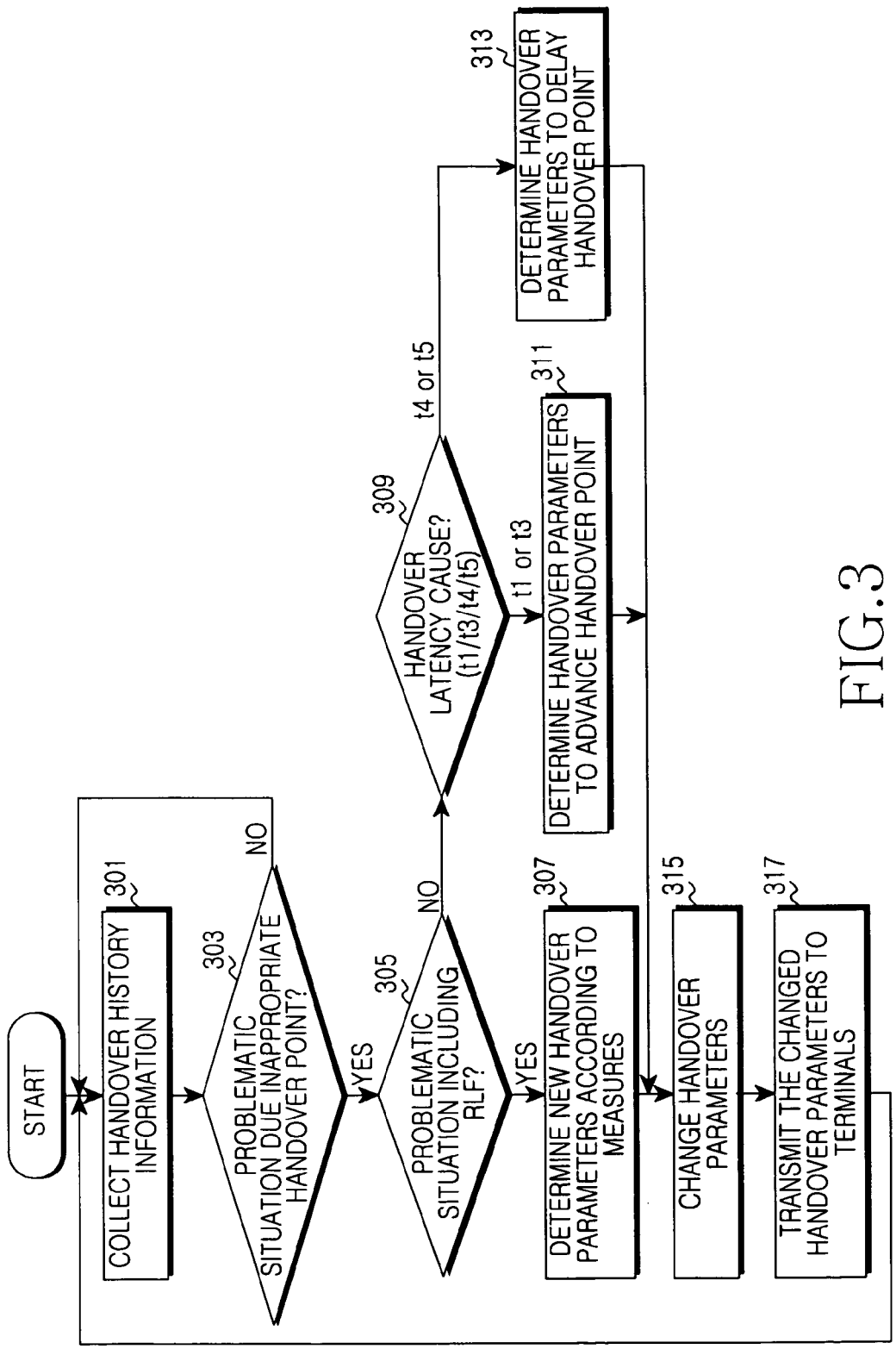
FIG. 3 illustrates operations of a base station in the broadband wireless communication system according to an embodiment of the present invention.

FIG. 3 illustrates the operations of the BS in the broadband wireless communication system according to an embodiment of the present invention.

In block 301, the BS collects the handover history information. More specifically, every time the accessed terminal performs a handover, the BS records the times for transmitting and receiving the messages related to the handover and the times of the events, and determines the handover success rate, the handover failure rate, the frequency of the RLF due to the late handover, the frequency of the RLF due to the early handover, the frequency of the RLF due to the handover to a wrong cell, the frequency of the unnecessary handover, the frequency of the handover within a certain time after the connection setup, and the average values of the t1 through the t5 by analyzing the recorded information. The handover history information is managed per neighbor BS. Block 301 is continuously performed throughout this process.

In block 303, the BS determines whether the problematic situation results from the inappropriate handover point (i.e. due to the early or late handover). Herein, the problematic situation due to the inappropriate handover point indicates the situations '1' through '4' of Table 2. The occurrence of the problematic situation is determined periodically at the regular time intervals, or every time the handover history information is updated.

When the problematic situation results from the inappropriate handover point, the BS checks whether the problematic situation includes the RLF in block 305. That is, the BS determines whether the problematic situation taking place is one of the situation '1' and the situation '3' of Table 2.

When the problematic situation taking place includes the RLF, that is, when the problematic situation taking place is one of the situation '1' and the situation '3' of Table 2, the BS determines new handover parameters according to the action taken for the problematic situation in block 307. Specifically as for the situation '1', the BS determines new handover parameters to advance the handover point. As for the situation '3', the BS determines new handover parameters to delay the handover point. For example, when the event A3 of Table 1 is the condition triggering the handover, the BS can advance the handover point by decreasing at least one of the 'Ofs', the 'Ocs', the 'Off', and the 'Hys', or by increasing at least one of the 'Ofn' and the 'Ocn'. Also, the BS can postpone the handover point by increasing at least one of the 'Ofs', the 'Ocs', the 'Off', and the 'Hys', or by decreasing at least one of the 'Ofn' and the 'Ocn'. In so doing, the change of the handover point depends on the change of the parameters.

By contrast, when the problematic situation taking place does not include the RLF; that is, when the problematic situation taking place is one of the situation '2' and the situation '4' of Table 2, the BS determines the cause of the handover latency in block 309. Herein, the cause of the handover latency is the threshold excess of at least one of the handover processing intervals t1, t3, t4 and t5. It is advantageous to define the threshold independently for each processing interval.

When the cause of the handover latency is the threshold excess of the t1 or the t3, the BS determines the handover parameters to advance the handover point in block 311. For example, when the event A3 of Table 1 is the condition triggering the handover, the BS can advance the handover point by decreasing at least one of the 'Ofs', the 'Ocs', the 'Off', and the 'Hys', or by increasing at least one of the 'Ofn' and the 'Ocn'.

By contrast, when the cause of the handover latency is the threshold excess of the t4 or the t5, the BS determines the handover parameters to postpone the handover point in block 313. For example, when the event A3 of Table 1 is the condition triggering the handover, the BS can delay the handover point by increasing at least one of the 'Ofs', the 'Ocs', the 'Off', and the 'Hys', or by decreasing at least one of the 'Ofn' and the 'Ocn'.

In block 315, the BS alters the existing handover parameters to the handover parameters determined in block 307, the block 311, or the block 313. Accordingly, terminals accessing the BS receive the newly determined handover parameters.

Next, to apply the newly defined handover parameters to the terminals currently accessing the BS, the BS transmits the newly determined handover parameters in block 317. That is, the measurement control through delivery of the handover parameters 101 in FIG. 1 is carried out.

In FIG. 3, the BS merely handles the problematic situation due to the inappropriate handover point. Additionally, the BS can determine and deal with other problematic situations. When the RLF results from the handover to the wrong cell, when the unnecessary handover takes place, or when the handover is performed within a certain time after the connection setup, the BS addresses the problematic situation by changing the handover parameters or by changing the condition of the event triggering the handover.

The embodiment of FIG. 3 considers the situations '1' through '4' of the problematic situations of Table 2. Alternatively, the BS considers the situation '2' and the situation '4'. In this situation, the block 305 and the block 307 can be omitted. Alternatively, the BS considers the situation '1' and the situation '3', where the block 309 through the block 313 can be omitted.

Figure 4:
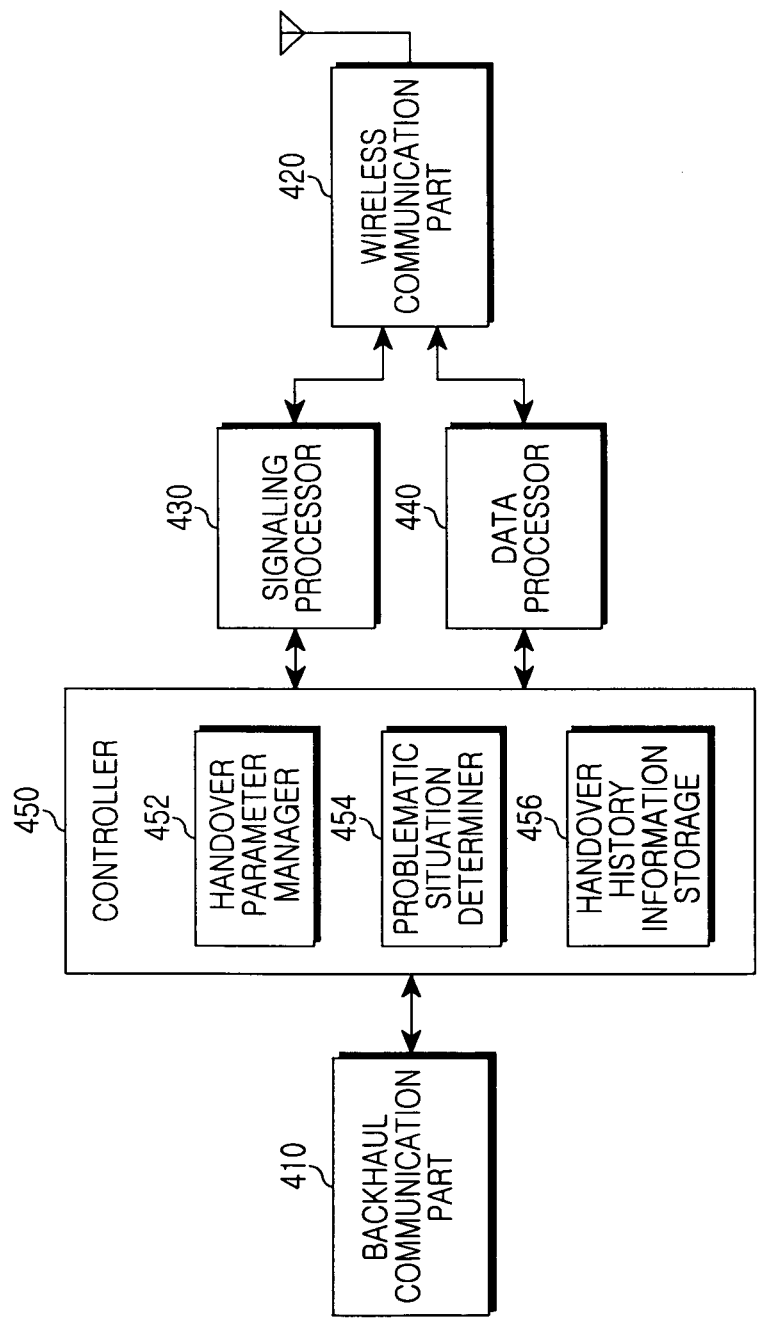
FIG. 4 illustrates the base station in the broadband wireless communication system according to an embodiment of the present invention.

FIG. 4 is a block diagram of the BS in the broadband wireless communication system according to an embodiment of the present invention.

The BS of FIG. 4 includes a backhaul communication part 410, a wireless communication part 420, a signaling processor 430, a data processor 440, and a controller 450.

The backhaul communication part 410 provides the interface for the wire communication with the neighbor BSs and the upper nodes. That is, the backhaul communication part 410 converts a physical signal received from the neighbor BS or the upper node to information bit string, and converts information bit string to transmit to the neighbor BS or the upper node to a physical signal.

The wireless communication part 420 provides the interface for the wireless communication with the terminals. For example, the wireless communication part 420 provides the radio interface according to the OFDM scheme. To transmit the signal, the wireless communication part 420 converts the bit string fed from the signaling processor 430 or the data processor 440 to complex symbols, maps the complex symbols to subcarriers, constitutes OFDM symbols through Inverse Fast Fourier Transform (IFFT) operation and Cyclic Prefix (CP) insertion, up-converts the OFDM symbols to a Radio Frequency (RF) signal, and then transmits the RF signal via an antenna. When receiving a signal, the wireless communication part 420 down-converts the RF signal received via the antenna, splits to the OFDM symbols, restores the complex symbols mapped to the subcarriers through the CP elimination and the FFT operation, converts the complex symbols to the bit string, and then provides the bit string to the signaling processor 430 or the data processor 440.

The signaling processor 430 generates a control message transmitted to the terminal and analyzes a control message received from the terminal. For instance, the signaling processor 430 generates the measurement control message for carrying the handover parameters and the handover command message instructing to perform the handover, and analyzes the measurement report message including the event occurrence report from the terminal and the handover completion message notifying of the handover completion. When analyzing the received control message, the signaling processor 430 informs the controller 450 of the reception of the control message, and provides the controller 450 with the information acquired from the control message. The data processor 430 temporarily stores data transmitted to the terminal and data received from the terminal, and processes functions required by the layers.

The controller 450 controls the functions of the BS. For example, the controller 450 controls the transmission and the reception of the signals, the management of the radio resource, and the access management of the terminal. In particular, the controller 450 includes a handover parameter manager 452 for managing the handover parameters, and a problematic situation determiner 454 and handover history information storage 456 for taking actions for the problematic situation which degrades the handover performance.

The handover history information storage 456 aggregates the handover history information. The handover history information storage 456 records the times for transmitting and receiving the messages related to the handover and the times of the event occurrence every time the accessing terminal performs a handover, and determines the handover success rate, the handover failure rate, the frequency of the RLF due to the late handover, the frequency of the RLF due to the early handover, the frequency of the RLF due to the handover to a wrong cell, the frequency of the unnecessary handover, the frequency of the handover within a certain time after the connection setup, and the average values of the t1 through the t5 by analyzing the recorded information. The handover history information is managed per neighbor BS.

The problematic situation determiner 454 determines whether the problematic situation which degrades the handover performance takes place. The occurrence of the problematic situation is determined periodically at the regular time intervals, or every time the handover history information is updated. For instance, when the problematic situation results from an inappropriate handover point, the problematic situation determiner 454 determines which one of the situations '1' through '4' of Table 2 is the occurring problematic situation, notifies the problematic situation, and instructs the handover parameter manager 452 to change the handover parameters. Because the situations '1' and '3' are the problematic situations including the RLF, the problematic situation determiner 454 distinguishes the situations '1' and '3' from the situations '2' and '4', according to the RLF.

Hence, the handover parameter manager 452 changes the handover parameters to alter the handover point. More specifically, when the situation '1' or the situation '2' takes place, the handover parameter manager 452 determines new handover parameters to advance the handover point. When the situation '3' or the situation '4' takes place, the handover parameter manager 452 determines new handover parameters to delay the handover point. For example, when the event A3 of Table 1 is the condition triggering the handover, the handover parameter manager 452 can advance the handover point by decreasing at least one of the 'Ofs', the 'Ocs', the 'Off', and the 'Hys', or by increasing at least one of the 'Ofn' and the 'Ocn'. Also, the handover parameter manager 452 can postpone the handover point by increasing at least one of the 'Ofs', the 'Ocs', the 'Off', and the 'Hys', or by decreasing at least one of the 'Ofn' and the 'Ocn'. Note that the change of the handover point for the situations '1' and '3' should be greater than the change of the handover point for the situations '2' and '4'. The change of the handover point depends on the change of the parameters. The handover parameter manager 452 changes the existing handover parameters to the determined handover parameters. Hence, the terminals accessing the BS receive the newly determined handover parameters.

To apply the newly defined handover parameters to the terminals currently accessing, the controller 450 controls the signaling processor 430 to transmit a message including the newly determined handover parameters.

In the embodiment of FIG. 4, the controller 450 handles only the problematic situation due to the inappropriate handover point. Additionally, the controller 450 can determine and deal with other problematic situations. When the RLF results from the handover to the wrong cell, when the unnecessary handover takes place, or when the handover is performed within a certain time after the connection setup, the controller 450 solves the problematic situation by changing the handover parameters or by changing the condition of the event triggering the handover.

In the broadband wireless communication system, not only the RLF in the handover and the wrong handover are determined, but also the increment of the handover latency. In this regard, the performance of the handover can be optimized by adjusting the point of the handover.

Although the present disclosure has been described with an embodiment, various changes and modifications may be suggested to one skilled in the art. It is intended that the present disclosure encompass such changes and modifications as fall within the scope of the appended claims.

What is claimed is:

1. A method for controlling a handover operation of a base station in a wireless communication system, the method comprising:
   determining whether a length of a fourth time interval taken for the terminal to synchronize with a target base station exceeds a fourth threshold time;
   if the length of the fourth time interval exceeds the fourth threshold time, determining to delay a time point to trigger the handover; and
   changing at least one handover parameter to delay the time point to trigger the handover;
   recording times for transmitting and receiving messages related to the handover and times of events taking place every time the terminal performs the handover; and
   aggregating handover history information comprising at least one of a handover success rate, a handover failure rate, a frequency of Radio Link Failure (RLF) due to a late handover, a frequency of the RLF due to an early handover, a frequency of RLF due to handover to a wrong cell, a frequency of an unnecessary handover, a frequency of the handover within a certain time after connection setup, an average value of a first time (t1), an average value of a second time (t2), an average value of a third time (t3), an average value of [fourth time (t4), and an average value of a fifth time (t5) by analyzing the recorded information.

2. The method of claim 1, wherein a condition triggering the handover is given by the following equation:

$$Mn+Ofn+Ocn-Hys>Ms+Ofs+Ocs+Off$$

where the Mn denotes a channel quality measurement value of a neighbor base station measured at a terminal, the Ofn denotes a frequency-specific offset of the neighbor base station, the Ocn denotes a specific offset of the neighbor base station, the Hys denotes a hysteresis parameter per event, the Ms denotes a channel quality measurement value of a serving base station measured at the terminal, the Ofs denotes a frequency-specific offset of the serving base station, the Ocs denotes a specific offset of the serving base station, and the Off denotes an offset parameter per event, and
   changing the at least one handover parameter to advance the handover point comprises at least one of:
      decreasing at least one of the Ofs, the Ocs, the Off, and the Hys, and
      increasing at least one of the Ofn and the Ocn.

3. The method of claim 1, wherein a condition triggering the handover is given by the following equation:

$$Mn+Ofn+Ocn-Hys>Ms+Ofs+Ocs+Off$$

where the Mn denotes a channel quality measurement value of a neighbor base station measured at a terminal, the Ofn denotes a frequency specific offset of the neighbor base station, the Ocn denotes a specific offset of the neighbor base station, the Hys denotes a hysteresis parameter per event, the Ms denotes a channel quality measurement value of a serving base station measured at the terminal, the Ofs denotes a frequency specific offset of the serving base station, the Ocs denotes a specific offset of the serving base station, and the Off denotes an offset parameter per event, and
   changing the at least one handover parameter to delay the handover point comprises at least one of:
      increasing at least one of the Ofs, the Ocs, the Off, and the Hys, and
      decreasing at least one of the Ofn and the Ocn.

4. The method of claim 1, further comprising:
   determining whether the RLF takes place due to the early or late handover, using the handover history information.

5. The method of claim 1, further comprising:
   determining, using the handover history information, whether the RLF results from the handover to a wrong cell, whether the unnecessary handover occurs, and whether the handover is performed within a certain time after connection setup; and
   changing at least one of the at least one handover parameter and a condition of an event which triggers the handover.

6. The method of claim 1, further comprising:
   transmitting the at least one changed handover parameter to at least one terminal.

7. The method of claim 1, further comprising:
   managing the handover history information per neighbor base station.

8. The method of claim 1, further comprising:
   determining whether a length of a fifth time interval taken for the terminal to notify a handover completion to the target base station exceeds a fifth threshold time;
   if the length of fifth time interval exceeds the fifth threshold time, determining to delay a time point to trigger the handover; and
   changing at least one handover parameter to delay the time point to trigger the handover.

9. The method of claim 1, further comprising:
   determining whether a length of a first time interval taken for the terminal to report an event occurrence to the serving base station exceeds a first threshold time;
   if the length of first time interval exceeds the first threshold time, determining to advance a time point to trigger the handover; and
   changing at least one handover parameter to advance the time point to trigger the handover.

10. The method of claim 1, further comprising:
   determining whether a length of a third time interval taken for the serving base station to instruct the handover to the terminal exceeds a third threshold time;
   if the length of third time interval exceeds the third threshold time, determining to advance a time point to trigger the handover; and
   changing at least one handover parameter to advance the time point to trigger the handover.

11. An apparatus of a base station in a wireless communication system, the apparatus comprising:
   a determiner configured to determine whether a length of a fourth time interval taken for a terminal to synchronize with a target base station exceeds a fourth threshold time; and
   a manager configured to, if the length of the fourth time interval exceeds the fourth threshold time, determine to delay a time point to trigger the handover, and change at least one handover parameter to delay the time point to trigger the handover point;

a storage part configured to record times for transmitting and receiving messages related to the handover and times of events taking place every time the terminal performs the handover, and aggregate handover history information comprising at least one of a handover success rate, a handover failure rate, a frequency of Radio Link Failure (RLF) due to a late handover, a frequency of RLF due to an early handover, a frequency of RLF due to the handover to a wrong cell, a frequency of an unnecessary handover, a frequency of the handover within a certain time after the connection setup, an average value of a first time (t1), an average value of a second time (t2), an average value of a third time (t3), an average value of a fourth time (t4), and an average value of a fifth time (t5), by analyzing the recorded information.

12. The apparatus of claim 11, wherein a condition triggering the handover is given by the following equation:

$$Mn+Ofn+Ocn-Hys>Ms+Ofs+Ocs+Off$$

where the Mn denotes a channel quality measurement value of a neighbor base station measured at a terminal, the Ofn denotes a frequency specific offset of the neighbor base station, the Ocn denotes a specific offset of the neighbor base station, the Hys denotes a hysteresis parameter per event, the Ms denotes a channel quality measurement value of a serving base station measured at the terminal, the Ofs denotes a frequency specific offset of the serving base station, the Ocs denotes a specific offset of the serving base station, and the Off denotes an offset parameter per event, and the manager is further configured to advance the handover point by at least one of:
decreasing at least one of the Ofs, the Ocs, the Off, and the Hys, and
increasing at least one of the Ofn and the Ocn.

13. The apparatus of claim 11, wherein a condition triggering the handover is given by the following equation:

$$Mn+Ofn+Ocn-Hys>Ms+Ofs+Ocs+Off$$

where the Mn denotes a channel quality measurement value of a neighbor base station measured at a terminal, the Ofn denotes a frequency specific offset of the neighbor base station, the Ocn denotes a specific offset of the neighbor base station, the Hys denotes a hysteresis parameter per event, the Ms denotes a channel quality measurement value of a serving base station measured at the terminal, the Ofs denotes a frequency specific offset of the serving base station, the Ocs denotes a specific offset of the serving base station, and the Off denotes an offset parameter per event, and the manager is further configured to delay the handover point by at least one of:
increasing at least one of the Ofs, the Ocs, the Off, and the Hys, and
decreasing at least one of the Ofn and the Ocn.

14. The apparatus of claim 11, wherein the determiner is further configured to determine whether the RLF takes place due to the early or late handover, using the handover history information.

15. The apparatus of claim 11, wherein the determiner is further configured to determine, using the handover history information, whether the RLF results from the handover to a wrong cell, whether unnecessary handover occurs, and whether the handover is performed within a certain time after connection setup, and the manager is further configured to change at least one of the at least one handover parameter and a condition of an event which triggers the handover.

16. The apparatus of claim 11, further comprising:
a communication part configured to transmit the at least one changed handover parameter to at least one terminal.

17. The apparatus of claim 11, further comprising:
a backhaul communication part configured to provide communication with the neighbor base station.

18. The apparatus of claim 11, wherein the storage part is further configured to manage the handover history information per neighbor base station.

19. The apparatus of claim 11, wherein the determiner deteiiuines whether a length of a fifth time interval taken for the terminal to notify a handover completion to the target base station exceeds a fifth threshold time; and wherein the manager, if the length of fifth time interval exceeds the fifth threshold time, determines to delay a time point to trigger the handover, and, changes at least one handover parameter to delay the time point to trigger the handover.

20. The apparatus of claim 11, wherein the determiner determines whether a length of a first time interval taken for the terminal to report an event occurrence to the serving base station exceeds a first threshold time; and wherein the manager, if the length of first time interval exceeds the first threshold time, determines to advance a time point to trigger the handover, and, changes at least one handover parameter to advance the time point to trigger the handover.

21. The apparatus of claim 11, wherein the determiner determines whether a length of a third time interval taken for the serving base station to instruct the handover to the terminal exceeds a third threshold time; and wherein the manager, if the length of third time interval exceeds the third threshold time, determining to advance a time point to trigger the handover, and, changes at least one handover parameter to advance the time point to trigger the handover.

* * * * *